United States Patent
Featherly et al.

(10) Patent No.: US 11,760,212 B1
(45) Date of Patent: Sep. 19, 2023

(54) ELECTRICAL POWER GENERATION AND DISTRIBUTION

(71) Applicant: ENERGY PRODUCING SYSTEMS OF AMERICA LLC, Boca Raton, FL (US)

(72) Inventors: Robert J. Featherly, New Port Richey, FL (US); Rudolph M. Toncich, Holiday, FL (US); Jay Cholost, Boca Raton, FL (US)

(73) Assignee: ENERGY PRODUCING SYSTEMS OF AMERICA LLC, Boca Raton, FL (US)

( * ) Notice: Subject to any disclaimer, the term of this patent is extended or adjusted under 35 U.S.C. 154(b) by 0 days.

(21) Appl. No.: 17/559,441

(22) Filed: Dec. 22, 2021

Related U.S. Application Data

(60) Provisional application No. 63/288,107, filed on Dec. 10, 2021.

(51) Int. Cl.
*B60L 50/40* (2019.01)
*B60L 50/13* (2019.01)

(52) U.S. Cl.
CPC ............. *B60L 50/40* (2019.02); *B60L 50/13* (2019.02); *B60L 2210/40* (2013.01)

(58) Field of Classification Search
CPC ....... B60L 50/40; B60L 50/13; B60L 2210/40
See application file for complete search history.

(56) References Cited

U.S. PATENT DOCUMENTS

| | | | | |
|---|---|---|---|---|
| 7,990,098 | B2* | 8/2011 | Perisic | B60L 50/61 363/55 |
| 8,183,820 | B2* | 5/2012 | Anwar | B60L 1/003 320/140 |
| 8,836,251 | B2* | 9/2014 | Tabatabaei | B60L 50/40 320/167 |
| 10,355,631 | B1* | 7/2019 | Secrest | H02P 21/22 |
| 10,396,696 | B1* | 8/2019 | Gagas | H02P 27/08 |
| 2009/0033251 | A1* | 2/2009 | Perisic | B60L 50/60 318/105 |
| 2009/0033274 | A1* | 2/2009 | Perisic | B60L 50/51 318/440 |
| 2010/0013438 | A1* | 1/2010 | Anwar | B60L 53/64 180/65.29 |
| 2013/0038249 | A1* | 2/2013 | Tabatabaei | H02J 7/1423 318/3 |
| 2019/0260319 | A1* | 8/2019 | Gagas | H02P 21/22 |
| 2021/0146792 | A1* | 5/2021 | Lehn | H02J 7/0013 |
| 2021/0291964 | A1* | 9/2021 | Gilbert | B60L 58/20 |

* cited by examiner

*Primary Examiner* — Tyler J Lee
(74) *Attorney, Agent, or Firm* — Quarles & Brady LLP

(57) ABSTRACT

Systems and methods of generating, storing and/or distributing electric power are disclosed. The system may include two or more direct current supercapacitor subsystems, a direct current motor/alternating current generator combination, an electric power distribution network, and supercapacitor recharging elements. One supercapacitor subsystem may power an alternating current generator while the other supercapacitor subsystem charges using a portion of the generated power. Excess power may service other electric loads. The roles of the supercapacitor subsystems may be switched periodically between charging and powering, repeatedly.

7 Claims, 7 Drawing Sheets

ELECTRICAL POWER GENERATION AND DISTRIBUTION

CROSS REFERENCE TO RELATED APPLICATIONS

This application relates to and claims the priority of U.S. patent application Ser. No. 63/288,107 which was filed Dec. 10, 2021.

FIELD OF THE INVENTION

The present invention relates generally to systems and methods of generating, storing and/or providing electrical energy.

BACKGROUND OF THE INVENTION

The consumption of electrical power worldwide is vast and will likely continue to grow as traditionally non-electrical powered machines are replaced with electrically powered counterparts. For example, electrically powered vehicles, and in particular passenger automobiles, are becoming more and more prevalent on nations' road systems. One popular electric automobile manufacturer in the United States with annual sales of roughly fifty thousand units in 2015-16 has announced its intention to grow the number of sales to five hundred thousand units within just a few years.

The impetus for switching to electrical power is multi-faceted. The cost and environmental impact of generating electrical power is considered superior to that of alternative power sources, such as fossil fuel based power. This superiority is amplified by governmental and industry incentives to the consumer for utilizing electrical power in place of non-electrical power. For example, electric vehicle users have enjoyed tax breaks, preferred parking, preferred road access, and free recharging, all provided due to the use of electric power as opposed to fossil-fuel generated power for their transportation needs. Accordingly, there is a continued and growing need for systems to generate, store and distribute electrical power.

Developed countries all have sophisticated electrical power generation and distribution systems deployed nationwide sometimes referred to as the "power grid." While the grid is widely used and ubiquitous, it is not always available, and may not provide the lowest cost of power over a prolonged period. Although power outages are rare, occasional storms can disrupt the distribution of electric power to large segments of the population for prolonged periods. These power outages interfere with home life and work and can result in substantial lost productivity and comfort. Further, the cost of obtaining electric power from the grid can be significant, and there is little ability to inject much competition into the system to drive prices down. Accordingly, there is a need for both mobile and stationary electric power generation systems which are of a scale to power a single home, business, and vehicle, and which do not depend heavily on the grid for day-to-day operation.

SUMMARY OF THE INVENTION

Responsive to the foregoing challenges, Applicant has developed an innovative electric power system comprising: an electric supercapacitor subsystem; a switching subsystem coupled to the electric supercapacitor subsystem; an electric power generation subsystem coupled to the switching subsystem and the electric supercapacitor subsystem; an inverter subsystem coupled to the power generation subsystem; an AC power distribution subsystem coupled to the inverter subsystem and an electric load; and a charging subsystem coupled to the AC power distribution subsystem, the electric supercapacitor subsystem, and the switching subsystem.

The electric power generation system comprises: an electrically powered function control subsystem coupled to the switching subsystem and the electric supercapacitor subsystem; a dielectric capacitor subsystem coupled to the electrically powered function control subsystem; an electric motor subsystem coupled to the electrically powered function control subsystem; and an electric generator subsystem coupled to the AC power distribution subsystem via an inverter subsystem, wherein the electric generator subsystem is operatively connected to, and receiving input rotational motion from, the electric motor subsystem. In an embodiment, the electric motor subsystem is a direct current ("DC") electric motor subsystem and the electric generator subsystem is a DC electric generator subsystem. In an embodiment, the inverter subsystem is at least one of an on-grid inverter subsystem and an off-grid inverter subsystem. For the purposes of this application, the terms electrically connected, connected, and coupled are used interchangeably.

In an embodiment the output rotational speed of the electric motor subsystem and input rotational speed provided to the electric generator subsystem are invariable with respect to one another. In an embodiment, the AC power distribution subsystem is coupled to an outlet load line configured to be connected to an electric load. In an embodiment, the charging subsystem comprises: a circuit breaker subsystem coupled to the AC power distribution subsystem; and a rectifier subsystem coupled to the electric supercapacitor subsystem, the switching subsystem, and the circuit breaker subsystem.

In an embodiment, the electric supercapacitor subsystem comprises a first pole with a first polarity and a second pole with a second polarity; wherein the switching subsystem is coupled to the first pole of the electric supercapacitor subsystem; the electrically powered function control subsystem is coupled to the switching subsystem and the second pole of the electric supercapacitor subsystem; and a charging subsystem is coupled to the switching subsystem and the second pole of the electric supercapacitor subsystem.

In an embodiment, the rotational speed of the electric motor subsystem is set to optimize power depletion of the electric supercapacitor subsystem for a predetermined level of available power on the outlet load line. In an embodiment, the electrically powered function control subsystem provides automatic adjustment of the relative rotational speed of the electric motor subsystem. In an embodiment, the electrically powered function control subsystem automatically sets an upper limit on available power for the outlet load line based on the power output of the electric generator subsystem and charging requirements of the electric supercapacitor subsystem.

Applicant has further developed an innovative electric power system comprising: an electric supercapacitor subsystem; a switching subsystem coupled to the electric supercapacitor subsystem; an inverter subsystem coupled to the switching subsystem, an AC power distribution subsystem, and a charging subsystem, wherein the charging subsystem is coupled to the electric supercapacitor subsystem and an electric power generation subsystem; a first inductor and a second inductor coupled to the power generation subsystem, wherein the first inductor is coupled to the inverter subsystem via switching subsystem and the second inductor is coupled to the electric supercapacitor subsystem via switching subsystem.

In an embodiment, the charging subsystem comprises: a circuit breaker subsystem coupled to the AC power distribution subsystem; and a rectifier subsystem coupled to the circuit breaker subsystem, the electric supercapacitor subsystem, and the power generation subsystem.

In an embodiment, the electric power generation subsystem comprises: an electrically powered function control subsystem coupled to the rectifier subsystem; a dielectric capacitor subsystem coupled to the electrically powered function control subsystem; an electric motor subsystem coupled to the electrically powered function control subsystem; and an electric generator subsystem coupled to the AC power distribution subsystem and the electric motor subsystem; wherein the electric generator subsystem is operatively connected to, and receiving input rotational motion from, the electric motor subsystem. In an embodiment, the output rotational speed of the electric motor subsystem and input rotational speed provided to the electric generator subsystem are invariable with respect to one another.

In an embodiment, the AC power distribution subsystem is coupled to an outlet load line configured to be connected to an electric load. In an embodiment, the electric motor subsystem is a DC electric motor subsystem and the electric generator subsystem is a DC electric generator subsystem. In an embodiment, the inverter subsystem is at least one of an on-grid inverter subsystem and an off-grid inverter subsystem.

Applicant has further developed an innovative electric power system comprising: an electric supercapacitor subsystem; a switching subsystem coupled to the electric supercapacitor subsystem; an inverter subsystem coupled to the switching subsystem; an AC power distribution subsystem coupled to the inverter subsystem and an electric load; a charging subsystem comprising a rectifier subsystem coupled to the AC power distribution subsystem; a power generation subsystem coupled to the charging subsystem; and a first inductor subsystem coupled to the power generation subsystem, the switching subsystem, and the inverter subsystem.

In an embodiment, the electric power generation subsystem comprises: an electrically powered function control subsystem coupled to the charging subsystem via the rectifier subsystem; a dielectric capacitor subsystem coupled to the electrically powered function control subsystem; an electric motor subsystem coupled to the electrically powered function control subsystem; and an electric generator subsystem coupled to the AC power distribution subsystem and the electric motor subsystem, wherein the electric generator subsystem is operatively connected to, and receiving input rotational motion from, the electric motor subsystem. In an embodiment, the output rotational speed of the electric motor subsystem and input rotational speed provided to the electric generator subsystem are invariable with respect to one another.

In an embodiment, the electric motor subsystem is a DC electric motor subsystem and the electric generator subsystem is a DC electric generator subsystem. In an embodiment, the inverter subsystem is at least one of an on-grid inverter subsystem and an off-grid inverter subsystem. In an embodiment, the electrically powered function control subsystem automatically sets an upper limit on available power for the outlet load line based on the power output of the electric generator subsystem and charging requirements of the electric supercapacitor subsystem.

Applicant has further developed an innovative electric power system comprising: an electric supercapacitor subsystem; a switching subsystem coupled to the electric supercapacitor subsystem; an off-grid inverter subsystem coupled to the switching subsystem; an AC power distribution subsystem coupled to the off-grid inverter subsystem, an on-grid inverter subsystem, an electric load, and a charging subsystem, wherein the charging subsystem is coupled to the supercapacitor subsystem; a power generation subsystem coupled to the charging subsystem; a first inductor coupled to the power generation subsystem and the switching subsystem; and a transfer switch subsystem coupled to the first inductor subsystem, switching subsystem, the off-grid inverter subsystem, and the on-grid inverter subsystem.

In an embodiment, the charging subsystem comprises: a circuit breaker subsystem coupled to the AC power distribution subsystem; and a rectifier subsystem coupled to the circuit breaker subsystem, the electric supercapacitor subsystem, and the power generation subsystem.

In an embodiment, the electric power generation subsystem comprises: an electrically powered function control subsystem coupled to the rectifier subsystem; a dielectric capacitor subsystem coupled to the electrically powered function control subsystem; an electric motor subsystem coupled to the electrically powered function control subsystem; and an electric generator subsystem coupled to the AC power distribution subsystem and the electric motor subsystem, wherein the electric generator subsystem is operatively connected to, and receiving input rotational motion from, the electric motor subsystem. In an embodiment, the output rotational speed of the electric motor subsystem and input rotational speed provided to the electric generator subsystem are invariable with respect to one another.

In an embodiment, the AC power distribution subsystem is coupled to an outlet load line configured to be connected to an electric load. In an embodiment, the electric motor subsystem is a DC electric motor subsystem and the electric generator subsystem is a DC electric generator subsystem. In an embodiment, a home electrical system is coupled to the on-grid inverter subsystem.

Applicant has further developed an innovative electric power system comprising: an electric supercapacitor subsystem; a switching subsystem coupled to the electric supercapacitor subsystem; an inverter subsystem coupled to the switching subsystem; a charging subsystem comprising a circuit breaker subsystem coupled to the inverter subsystem; a power generation subsystem coupled to the charging subsystem; an AC power distribution subsystem coupled to the power generation subsystem and an electric load; a quick charging subsystem comprising a rectifier subsystem coupled to the AC power distribution subsystem, the switching subsystem, and the electric supercapacitor subsystem. In an embodiment, the inverter subsystem is at least one of an on-grid inverter subsystem and an off-grid inverter subsystem.

In an embodiment, the electric power generation subsystem comprises: an electrically powered function control subsystem coupled to the circuit breaker subsystem; an electric motor subsystem coupled to the electrically powered function control subsystem; and an electric generator subsystem coupled to the AC power distribution subsystem and the electric motor subsystem, wherein the electric generator subsystem is operatively connected to, and receiving input rotational motion from, the electric motor subsystem. In an embodiment, the output rotational speed of the electric motor subsystem and input rotational speed provided to the electric generator subsystem are invariable with respect to one another. In an embodiment, the electric motor subsystem is an AC electric motor subsystem and the electric generator subsystem is an AC electric generator subsystem.

Applicant has further developed an innovative method of generating, storing and distributing electric power comprising: applying DC electric power from an electric supercapacitor subsystem to an electrically powered function control subsystem, wherein the electrically powered function control subsystem is coupled to a dielectric capacitor subsystem; applying the DC electric power from the electrically powered function control subsystem to a DC motor subsystem; providing input rotational motion from the DC motor subsystem to an DC electric generator subsystem, wherein output rotational speed of the DC motor subsystem and input rotational speed provided to the DC electric generator subsystem are invariable with respect to one another; generating DC electric power from the output rotational motion of the DC motor subsystem, wherein a rotational speed is set to optimize wattage supply for external electric distribution; applying the DC electric power from the to the DC electric generator subsystem to at least one of an off-grid inverter subsystem and an on-grid inverter subsystem; converting the DC electric power to AC electric power; applying the AC electric power to an AC power distribution subsystem; distributing a first portion of the AC electric power from the AC power distribution subsystem to an outlet load line connected to an electric load; distributing a second portion of the AC electric power from the AC power distribution subsystem to a circuit breaker subsystem; applying the AC electric power from the circuit breaker subsystem to a rectifier subsystem and generating additional DC electric power using the rectifier subsystem; and applying the additional DC electric power from the rectifier subsystem to the electric supercapacitor subsystem, wherein a relationship of the output rotational motion of the DC electric motor subsystem is set to optimize power depletion of the electric supercapacitor subsystem for a predetermined level of available power on the outlet load line.

Applicant has further developed an innovative method of generating, storing, and distributing electric power comprising: applying DC electric power from an electric supercapacitor subsystem to a switching subsystem; applying the DC electric power from the switching subsystem to at least one of an off-grid inverter subsystem and an on-grid inverter subsystem via output conductor; converting the DC electric power to AC electric power; distributing a first portion of the AC electric power to an AC electric power distribution subsystem; applying the first portion of the AC electric power from the AC electric power distribution subsystem to an outlet load line coupled to an electric load; distributing a second portion of the AC electric power to a circuit breaker subsystem; applying the second portion of the AC electric power from the circuit breaker subsystem to a rectifier subsystem; converting the second portion of the AC electric power to DC electric power; applying the DC electric power to an electrically powered function control subsystem; applying the DC electric power from the electrically powered function control subsystem to a DC motor subsystem; providing input rotational motion from the DC motor subsystem to a DC electric generator subsystem, wherein the output rotational speed of the DC motor subsystem and input rotational speed provided to the DC electric generator subsystem are invariable with respect to one another; generating DC electric power from the output rotational motion of the DC motor subsystem, wherein rotational speed is set to optimize wattage supply for distribution to the electric load; applying a first portion of the DC electric power from the DC electric generator subsystem to a first inductor subsystem; applying the first portion of the DC electric power from the first inductor subsystem to the on-grid inverter subsystem; applying a second portion of the DC electric power from the DC electric generator subsystem to a second inductor subsystem; and applying the second portion of the DC electric power from the second inductor subsystem to the switching subsystem via input conductor.

Applicant has further developed an innovative method of generating, storing, and distributing electric power comprising: applying DC electric power from an electric supercapacitor subsystem to a switching subsystem; applying the DC electric power from the switching subsystem to at least one of an off-grid inverter subsystem and an on-grid inverter subsystem via output conductor; converting the DC electric power to AC electric power; applying the AC electric power to an AC electric power distribution subsystem; distributing a first portion of the AC electric power from the AC electric power distribution subsystem to an outlet load line coupled to an electric load; distributing a second portion of the AC electric power from the AC electric power distribution subsystem to a rectifier subsystem; converting the second portion of the AC electric power to DC electric power; applying the DC electric power to an electrically powered function control subsystem; applying the DC electric power from the electrically powered function control subsystem to a DC motor subsystem; providing input rotational motion from the DC motor subsystem to a DC electric generator subsystem, wherein the output rotational speed of the DC motor subsystem and input rotational speed provided to the DC electric generator subsystem are invariable with respect to one another; generating DC electric power from the output rotational motion of the DC motor subsystem, wherein rotational speed is set to optimize wattage supply for distribution to the electric load; applying a first portion of the DC electric power from the DC electric generator subsystem to a first inductor subsystem; and applying a second portion of the DC electric power from the DC electric generator subsystem to the switching subsystem via input conductor; and applying a variable amount of the second portion of the DC electric power from the switching subsystem to the electric supercapacitor subsystem.

Applicant has further developed an innovative method of generating, storing, and distributing electric power comprising: applying DC electric power from an electric supercapacitor subsystem to a switching subsystem; applying the DC electric power from the switching subsystem to an off-grid inverter subsystem via output line; converting the DC electric power to AC electric power; applying the AC electric power to an AC electric power distribution subsystem; distributing a first portion of the AC electric power from the AC electric power distribution subsystem to an outlet load line coupled to an electric load; distributing a second portion of the AC electric power from the AC electric power distribution subsystem to circuit breaker subsystem; applying the second portion of the AC electric power from the circuit breaker subsystem to a rectifier subsystem; converting the second portion of the AC electric power to DC electric power; distributing a first portion of the DC electric power to an electric supercapacitor subsystem; distributing a second portion of the DC electric power to an electrically powered function control subsystem; applying the DC electric power from the electrically powered function control subsystem to a DC motor subsystem; providing input rotational motion from the DC motor subsystem to a DC electric generator subsystem, wherein output rotational speed of the DC motor subsystem and input rotational speed provided to the DC electric generator subsystem are invariable with respect to one another; generating DC electric power from the DC electric generator subsystem via the output rotational motion of the DC motor subsystem; applying the DC electric power from the DC electric generator subsystem to a first inductor; distributing a first portion of the DC electric power from the first inductor to the switching subsystem via input conductor; applying a variable amount of the first portion of the DC electric power from the switching subsystem to the electric supercapacitor subsystem; distributing a second portion of the DC electric power from the first inductor to a transfer switch subsystem; distributing a first portion of the DC electric power from the transfer switch subsystem to an off-grid inverter subsystem; distributing a second portion of the DC electric power from the transfer switch subsystem to an on-grid inverter subsystem; converting both the first portions and second portions of the DC electric power to AC electric power; applying the AC electric power from both the off-grid inverter subsystem and the on-grid inverter subsystem to an AC power distribution subsystem; and applying the AC electric power from the AC power distribution subsystem to an electric load via outlet load line.

Applicant has further developed an innovative method of generating, storing, and distributing electric power comprising: applying DC electric power from an electric supercapacitor subsystem to a switching subsystem; applying the DC electric power from the switching subsystem to at least one of an off-grid inverter subsystem and an on-grid inverter subsystem via output line; converting the DC electric power to AC electric power; applying the AC electric power to a circuit breaker subsystem; applying the AC electric power from the circuit breaker subsystem to an electrically powered function control subsystem; applying the AC electric power from the electrically powered function control subsystem to an AC motor subsystem; providing input rotational motion from the AC motor subsystem to an AC electric generator subsystem, wherein output rotational speed of the AC motor subsystem and input rotational speed provided to the AC electric generator subsystem are invariable with respect to one another; generating AC electric power from the AC electric generator subsystem via the output rotational motion of the AC motor subsystem; applying the AC electric power from the AC electric generator subsystem to an AC power distribution subsystem; distributing a first portion of the AC electric power from the AC power distribution subsystem to an electric load via outlet load line; distributing a second portion of the AC electric power from the AC power distribution subsystem to a quick charging subsystem; converting the second portion of the AC electric power to DC electric power; applying a first portion of the DC electric power to the switching subsystem via input conductor; and applying a second portion of the DC electric power to the electric supercapacitor subsystem.

It is to be understood that both the foregoing general description and the following detailed description are exemplary and explanatory only, and are not restrictive of the invention as claimed.

BRIEF DESCRIPTION OF THE DRAWINGS

In order to assist the understanding of this invention, reference will now be made to the appended drawings, in which like reference characters refer to like elements. The drawings are exemplary only, and should not be construed as limiting the invention.

DETAILED DESCRIPTION OF EMBODIMENTS OF THE INVENTION

Figure 1:
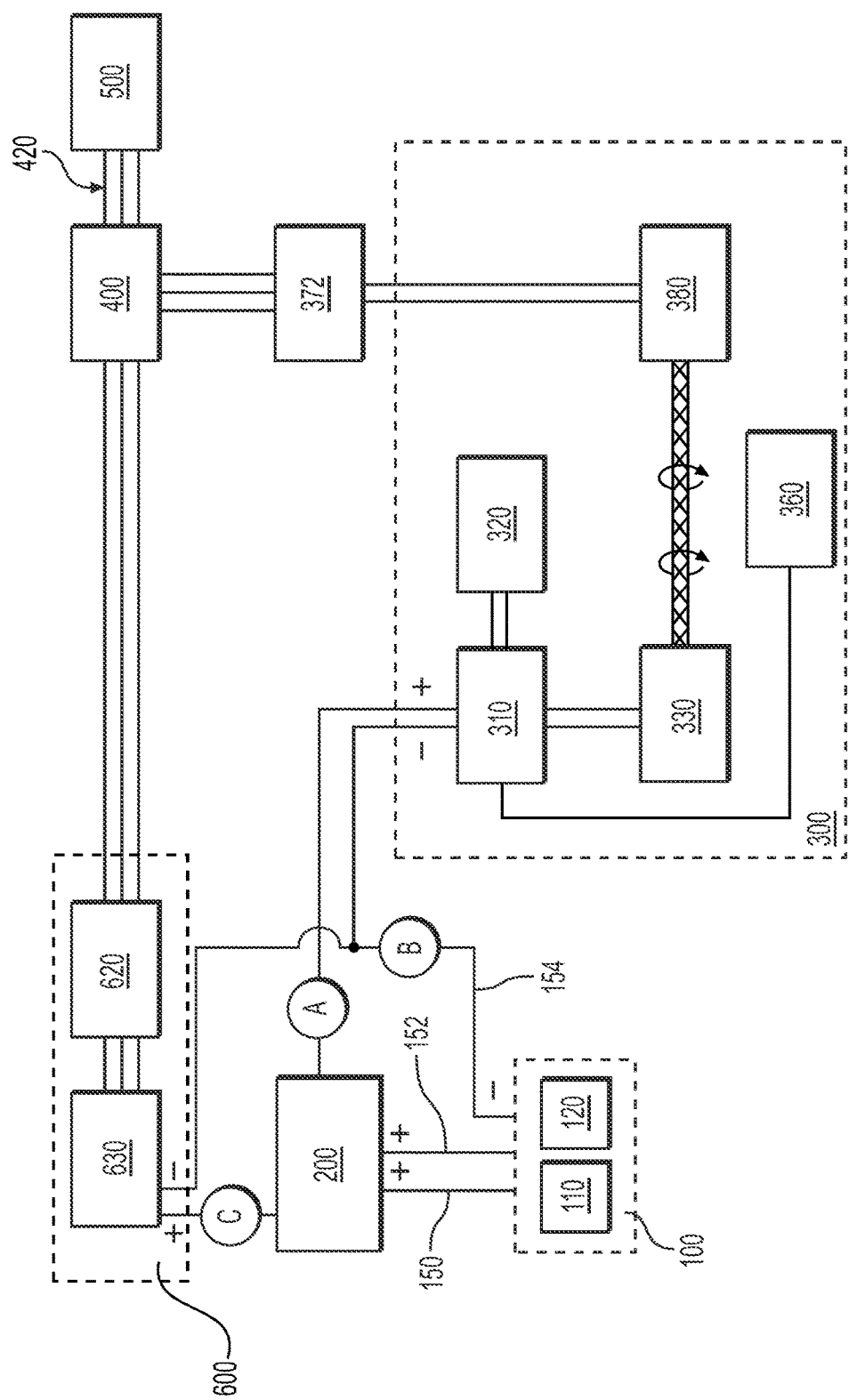
FIG. 1 is a schematic diagram of an electric power generation, distribution and storage system in accordance with a first embodiment of the present invention.

A supercapacitor (also known as an ultracapacitor, double-layer capacitor, or an electrochemical capacitor), is a high-capacity capacitor with a capacitance value much higher than other capacitors, but with lower voltage limits. Supercapacitors bridge the gap between normal dielectric (or electrolytic) capacitors and rechargeable batteries. Supercapacitors can accept and deliver charge much faster than rechargeable batteries and tolerate many more charge and discharge cycles than rechargeable batteries.

Supercapacitors use electrostatic double-layer capacitance and electrochemical pseudocapacitance, both of which contribute to the total capacitance of the capacitor. Supercapacitors fall into roughly three categories: 1) electrostatic double-layer capacitors (EDLCs), using activated carbon electrodes or derivatives with much higher electrostatic double-layer capacitance than electrochemical pseudocapacitance and in which energy storage predominantly is achieved by double-layer capacitance; 2) electrochemical pseudocapacitors using metal oxide or conducting polymer electrodes with a high amount of electrochemical pseudocapacitance additional to the double-layer capacitance; and 3) hybrid capacitors, such as the lithium-ion capacitor, with asymmetric electrodes, one of which exhibits mostly electrostatic and the other mostly electrochemical capacitance.

Batteries offer a superior energy/power density (high specific energy) enabling long-term storage of energy and possess a higher breakdown voltage. However, they suffer from a limited life cycle, voltage and current limitations, increased charging times, and temperature sensitivity.

Compared to rechargeable batteries, supercapacitors feature higher peak currents, high load currents, low resistance enabling high load currents, rapid-charging (can be in seconds), low cost per cycle, and non-corrosive electrolyte and low material toxicity. The supercapacitor has an extended cycle life, ranging from 100,000 to a million or more cycles. Unlike the electrochemical battery, which has a defined cycle life (lithium-ion batteries average between 500 and 10,000 cycles). Under normal conditions, a supercapacitor fades from the original 100 percent capacity to 80 percent in 10 years. The real application lifetime of supercapacitors, also called "service life", "life expectancy" or "load life", can reach 10 to 20 years or more at room temperature. In sum, supercapacitors provide long life cycles, high load currents, fast charging times, and good temperature performance.

Despite these advantages, supercapacitors possess limitations that make them unsuitable for a number of applications. Supercapacitors have a low specific energy/density and the amount of energy stored per unit weight is considerably lower compared to an electrochemical battery (about 3 to 5 W·h/Kg for a supercapacitor compared to 30 to 40 W·h/Kg of a battery). Additionally, supercapacitors cannot be used in higher frequency circuits (AC, for example), linear discharge voltage prevents using the full energy spectrum, considerably higher self-discharge rate than most batteries, low individual cell voltage, and requires series connections with voltage balancing, and a high cost per watt compared to batteries. After significant experimentation attempting to overcome these limitations, for example, stabilizing the charge cycle, Applicant discovered that supercapacitors when used with other elements of the disclosure, discussed below, Applicant could control the output of the supercapacitor and still retain the ability to recharge the supercapacitor rapidly. This discovery enabled the use of a supercapacitor in the electrical power and distribution system presently disclosed.

Previously, supercapacitors were unable to be used as a replacement for batteries, they were limited to low voltage applications, such as cell phones, laptop computers, headphones and the like. Applicant has created a system with the ability to quick charge the supercapacitor in conjunction with a slow regulated release of its stored energy. Applicant has developed a system that can harness the power, and benefit from the advantages, of a supercapacitor, while limiting the disadvantages that would normally make the supercapacitor unfit for use in the system of the present disclosure.

Reference will now be made in detail to embodiments of the present invention, examples of which are illustrated in the accompanying drawings.

With reference to FIG. 1, in a first embodiment of the invention, a supercapacitor subsystem 100 may be electrically connected by a switching subsystem 200 to an electric power generation subsystem 300. The electric power generation subsystem 300 may be electrically connected to an AC power distribution subsystem 400, which in turn may be connected to a load source 500 and a supercapacitor charging subsystem 600. The supercapacitor charging subsystem 600 may be connected to the supercapacitor subsystem 100 directly, and/or through the switching subsystem 200, completing the circuit. In an embodiment, the power generation subsystem 300 may be coupled to the AC power distribution subsystem 400 via an inverter subsystem. The inverter subsystem may be an off-grid inverter subsystem 372 or an on-grid inverter subsystem 370. It is envisioned that the supercapacitor subsystem 100 may comprise any other suitable power source, and is not limited to supercapacitors.

The supercapacitor subsystem 100 may be comprised of at least one supercapacitor. By way of example only, an embodiment of the present disclosure the supercapacitor subsystem 100 comprises two supercapacitors, 110 and 120. The individual supercapacitors may be connected in series. In a non-limiting example, each supercapacitor 110, 120, or supercapacitor subsystem 100, may provide about 8 kW constant output for about a 60 minute period, followed by about 15 minutes of recharging (or rest) and about 15 minutes of rest if just recharged (or recharging if just rested).

It is appreciated that the type, voltage, amperage, and other materials and qualities of the supercapacitor used may vary without departing from the intended scope of the disclosure.

The supercapacitor 110, 120 should have sufficient power and amperage when combined into supercapacitor subsystem 100 to power the switching subsystem 200, power generation subsystem 300, load source 500, and supercapacitor charging subsystem 600 for a defined period of time without excessive discharge. In one embodiment, each supercapacitor 110 and 120 may, at the start of supercapacitor life, power the overall system for about 15 minute periods out of an about 15 minute cycle without discharging more than about 50 percent.

In an embodiment, first positive poles of the first and second supercapacitor 110 and 120 may be electrically connected to the switching subsystem 200 via conductors 150 and 152, respectively. In turn, the switching subsystem 200 may be electrically connected via a positive polarity conductor through point A to the power generation subsystem 300 and via a positive polarity conductor through point C to the supercapacitor charging subsystem 600. The negative poles of the first and second supercapacitor subsystems 110 and 120 may be electrically connected to the power generation subsystem 300 and the supercapacitor charging subsystem 600 via conductor 154 through point B.

Figure 2:
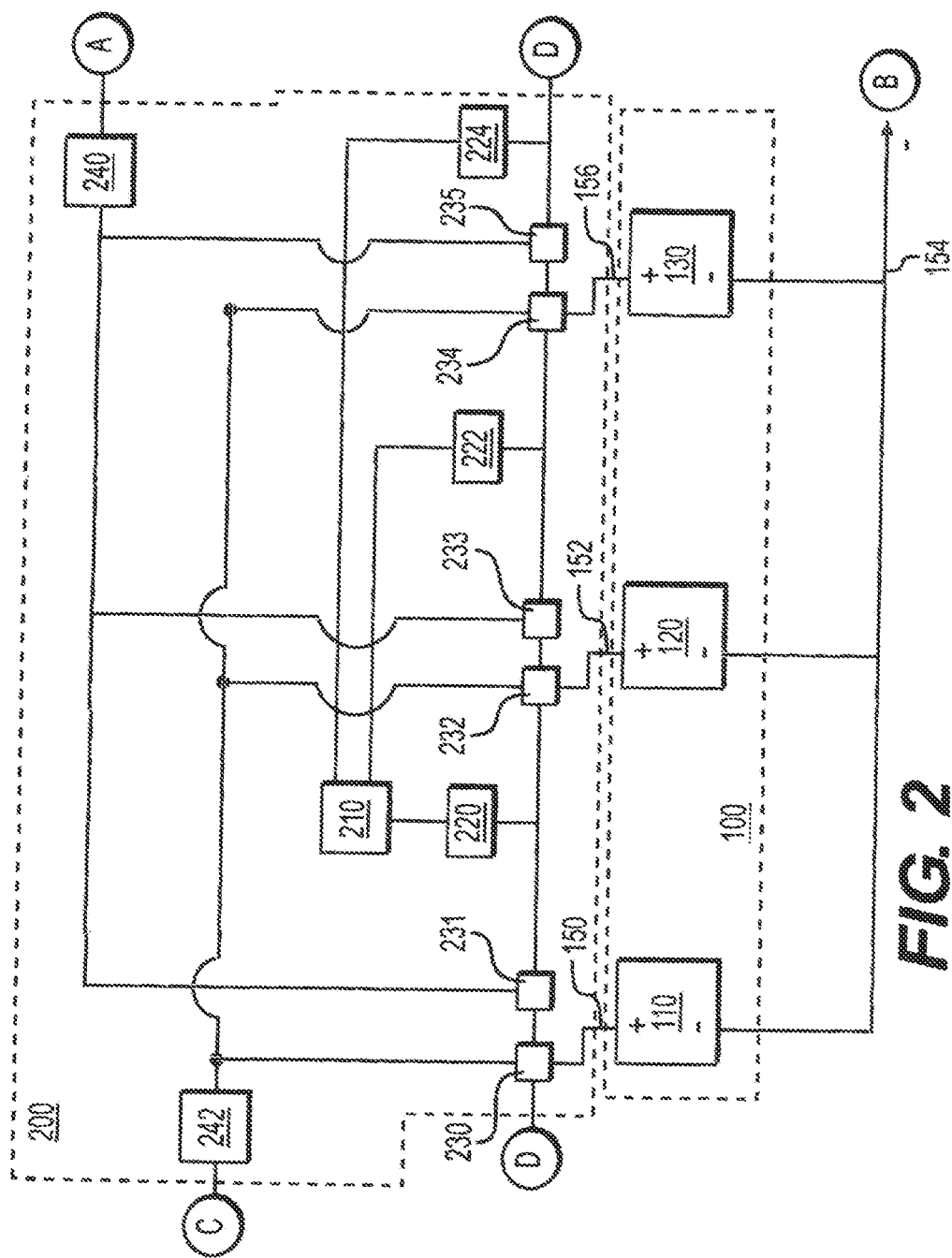
FIG. 2 is a detailed schematic diagram of the supercapacitor subsystem and switching subsystem of the system illustrated in FIG. 1.

One non-limiting embodiment of the switching subsystem 200 is illustrated in FIG. 2. By way of example only, this embodiment of the switching subsystem 200 employs three supercapacitors, 110, 120, and 130. With reference to FIG. 2, the switching subsystem 200 may include one or more timers 210 that may be electrically connected to first, second and third low voltage contactors 220, 222 and 224. The first low voltage contactor 220 may control the first and second high voltage contactors 231 and 232; the second low voltage contactor 222 may control third and fourth high voltage contactors 233 and 234; and the third low voltage contactor 224 may control fifth and sixth high voltage contactors 235 and 230, connected together through point D in the circuit.

Under control of the timers 210 and the first and third low voltage contactors 220 and 224, the first and sixth high voltage contactors 231 and 230 may selectively connect the first supercapacitor subsystem 110 to a first bus 240, a second bus 242, or to neither bus. The timers 210 and the first and second low voltage contactors 220 and 222 may control the second and third high voltage contactors 232 and 233 to selectively connect the second supercapacitor subsystem 120 to the first bus 240, the second bus 242, or to neither bus. Similarly, the timers 210 and the second and third low voltage contactors 222 and 224 may control the fourth and fifth high voltage contactors 234 and 235 to selectively connect the third supercapacitor subsystem 130 to the first bus 240, the second bus 242, or to neither bus.

The timers 210 may send low voltage control signals to the first, second and third low voltage contactors 220, 222 and 224 automatically and/or under the control of an electrically powered function control subsystem 310, discussed in more detail below. Such signals may activate a particular low voltage contactor and cause it to open or close the high voltage contactors connected to it. As a result, the combination of the timers 210, low voltage contactors 220, 222 and 224, and high voltage contactors 230, 231, 232, 233, 234 and 235 may selectively connect each of the supercapacitor subsystems 110, 120 and 130 to the first bus 240, the second bus 242 or to neither bus. The cascade arrangement of the timers 210, the low voltage contactors 220, 222, 224, and the high voltage contactors 230-235 permits only one of the supercapacitor subsystems to be connected to the first bus 240 and only one other of the supercapacitor subsystems to be connected to the second bus 242, at a time. It is appreciated, however that the system may tolerate the possibility of a short duration of overlap time during which two supercapacitor subsystems may be connected to the same bus at the same time.

With reference to FIGS. 1 and 2, the first bus 240 may be connected through point A to the power generation subsystem 300, and the second bus 242 may be connected through point C to the supercapacitor charging subsystem 600. Thus, functionally the switching subsystem 200 may be adapted to selectively switch between:

(i) connecting the first pole of the first supercapacitor subsystem 110 to the supercapacitor charging subsystem 600 while at the same time connecting the first pole of the second supercapacitor subsystem 120 to the power generation subsystem 300 during a first operational phase, and (ii) connecting the first pole of the second supercapacitor subsystem 120 to the supercapacitor charging subsystem 600 while at the same time connecting the first pole of the first supercapacitor subsystem 110 to the power generation subsystem 300 during a second operational phase.

In the event a third supercapacitor subsystem 130 is used, the switching subsystem 200 may be adapted to selectively switch between connecting the first pole of the third supercapacitor subsystem 130 to the supercapacitor charging subsystem 600 while at the same time connecting the first pole of the first supercapacitor subsystem 110 to the power generation subsystem 300 during a third operational phase.

Figure 3:
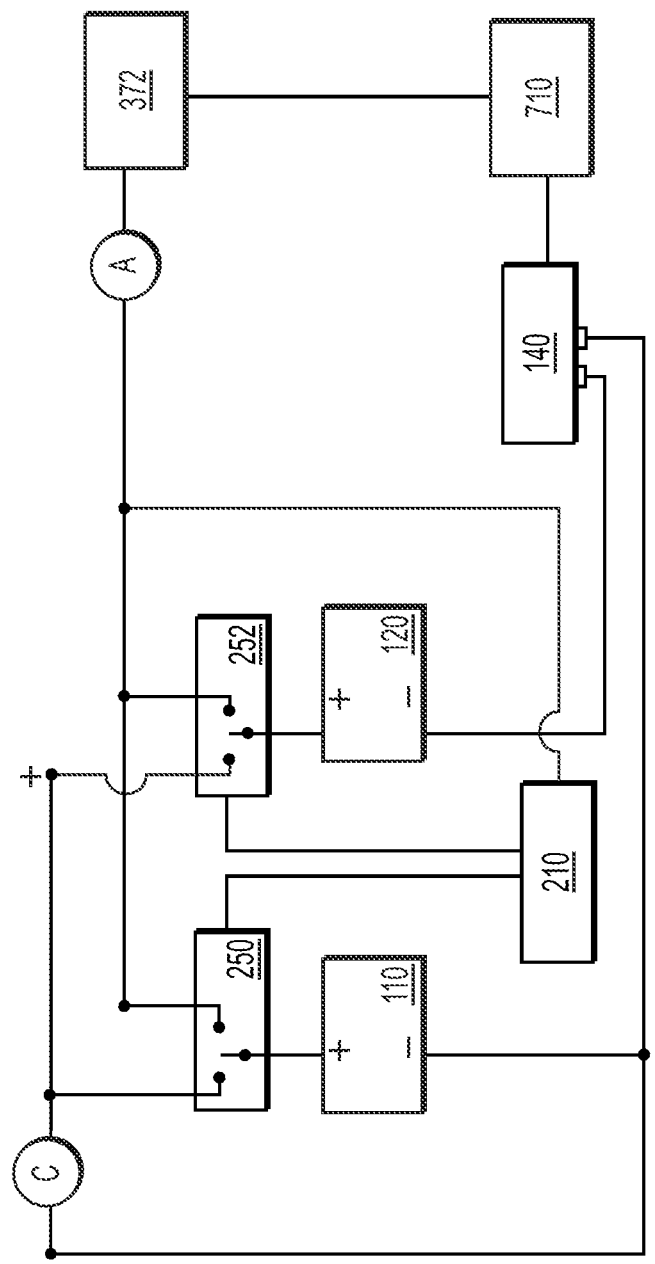
FIG. 3 is a detailed schematic diagram of an alternative switching subsystem for the system illustrated in FIG. 1.

An alternative embodiment of the switching subsystem 200 is illustrated by the FIG. 3 schematic diagram. With regard to FIGS. 1 and 3, three-way switches 250 and 252 may each connect the positive pole of an associated supercapacitor (110 and 120) to one of: point A or point C in the overall circuit, or a circuit disconnect position (as shown). The three-way switches 250 and 252 may be controlled by one or more timers 210 to provide switching similar to that provided by the FIG. 2 embodiment.

With renewed reference to FIG. 1, the power generation subsystem 300 comprises an electrically powered function control subsystem 310 electrically connected to and powered by the supercapacitor subsystem 100 through the switching subsystem 200. The function control subsystem 310 may optionally be connected to and control the timers 210 in the switching subsystem 200. The function control subsystem 310 may provide power from one of the supercapacitors 110, 120 in the supercapacitor subsystem 100 at a time to drive the electric motor subsystem, which in turn may drive the electric generator subsystem. The function control subsystem 310 may control the speed of the electric motor subsystem. In an embodiment, the electric motor subsystem is a direct current (DC) electric motor subsystem 330 and the electric generator subsystem is a DC electric generator subsystem 380. In an embodiment, the electric motor subsystem is an alternate current (AC) electric motor subsystem 340 and the electric generator subsystem is an AC electric generator subsystem 350. In the present nonlimiting embodiment, Applicant refers to the use of the system wherein the electric motor subsystem is a DC electric motor subsystem 330 and the electric generator subsystem is a DC electric generator subsystem 380.

Regular generators possess a high torque requirement, which made the addition of a gear box necessary in previously known systems. In those systems a gear box was required to lower the torque and lower the power consumed by the motor. By using a novel specially designed generator with low torque requirements the gear box is eliminated from the current system. This removes a mechanical element from the system that may be subject to failure and it further removes the stress the gear box added to the system, and makes the system more efficient.

The power generation subsystem 300 may also include a cooling subsystem 360 controlled by the function control subsystem 310. The cooling subsystem 360 may be in operational contact with any and/or all heat generating components of the overall system, such as the function control subsystem 310, the DC electric motor subsystem 330, and the DC electric generator subsystem 380. The cooling subsystem 360 may maintain system elements in optimal operating temperature ranges in a manner known to those of skill in the art.

A dielectric (or electrolytic) capacitor subsystem 320 may be electrically coupled to the function control subsystem 310. The dielectric capacitor subsystem 320 may include a plurality of dielectric capacitors interconnected in parallel with one another. The dielectric capacitor subsystem 320 may be used to control and correct system characteristics such as power factor lag and phase shift. The dielectric capacitor subsystem 320 may also increase stored energy and improve stabilization of the sine wave generated by the processor in the function control subsystem 310.

The function control subsystem 310 may include a digital processor, digital memory components, and control programming, as needed to operate the overall system in the manner described herein. For example, the function control subsystem 310 may include programming that controls system components for a start-up sequence, a shut-down sequence, vibration monitoring, overheat monitoring, and remote monitoring. The function control subsystem 310 may also include or be connected to one or more parameter monitoring components that provide system data. Such data may include, but not limited to: supercapacitor charge level and capacity, supercapacitor amperage, supercapacitor voltage, supercapacitor usage time, supercapacitor charge time, current time, system element temperatures, vibration, source load, electric motor torque, electric motor rpm, electric generator torque, electric generator rpm, supercapacitor charging system load, rectifier settings, and inductor settings.

The size and operational characteristics of the DC electric motor subsystem 330 and DC electric generator subsystem 380 may be selected to provide optimal power generation and supercapacitor life for a given expected load 500 to be serviced by the system, as well as recharge rate and time for the supercapacitor subsystems 110 and 120. For supercapacitor subsystems 100 of the type described, the DC electric motor 330 may require 350 V/50 A to maintain operation. The speed of the DC electric motor 330 is preferably set at or near the minimum rpm needed to drive the DC electric generator 380 to provide the required amperage and voltage to service the load 500 and recharge one supercapacitor subsystem while at the same time reducing or minimizing torque imposed by the DC electric generator 380. The use of a novel low torque requirement DC electric generator 380 may provide torque at the DC electric generator 380 without increasing (and preferably decreasing) the torque requirements of the DC electric motor 330, thereby lowering the power drain on the supercapacitor subsystem 100 driving the DC electric motor 330 and improving supercapacitor depletion characteristics for a given power output of the DC electric generator 380.

The speed of the electric motor 330 may be automatically set on a real-time, moment-to-moment basis by the function control subsystem 310. The function control subsystem 310 may receive electric motor 330 speed data from a speed sensor, located, for example, on the shaft of the electric motor 330, as well as supercapacitor recharging and load 500 power requirements from other sensors. The function control subsystem 310 may adjust the electric motor 330 speed so that the DC electric generator 380 provides the required power at that point in time at maximum torque to the DC electric generator 380 and minimum torque on the electric motor 330. In this manner, the function control subsystem 310 may optimize power generation conditions (electric motor rpm speed and electric generator 380 rpm speed) on a real-time basis.

The DC electric generator subsystem 380 may be connected via one or more electrical conductors to an off-grid inverter subsystem 372 which is then, in turn, connected to the AC power distribution subsystem 400. In an embodiment, the off-grid inverter subsystem 372 may be replaced with an on-grid inverter subsystem 370. In an embodiment, the power distribution subsystem 400 may comprise an AC breaker box, for example (not shown). The AC power distribution subsystem 400 may be connected via one or more conductors to the load source 500 and the supercapacitor charging subsystem 600. The power needs of the load source 500 and the supercapacitor charging subsystem 600 may be communicated to the function control subsystem 310 via wired or wireless communication channels from sensors associated with the AC power distribution subsystem 400, load source 500, and/or supercapacitor charging subsystem 600. The power needs may be used by an automatic throttle control module (not shown) of the function control subsystem 310 to set the DC electric motor 330 to run at the correct rpm's for the power needs of the system.

The supercapacitor charging subsystem 600 comprises a circuit breaker subsystem 620 electrically connected to the AC power distribution subsystem 400 and a rectifier subsystem 630. The rectifier subsystem 630 is connected to the supercapacitor subsystem 100 via the switching subsystem 200. The combination of the circuit breaker subsystem 620 and the rectifier subsystem 630 are used to provide the required level of recharge to one of the idle supercapacitors 110 or 120 over the desired recharge cycle, which, in the case of a system using two supercapacitor subsystems 110 and 120 is one-half of the overall system cycle time. The rectifier subsystem 630 may be self-adjusting to accommodate the recharge draw of the supercapacitor subsystem 110 or 120 currently charging.

The systems illustrated in FIGS. 1-3 may be used to generate, store, and distribute electricity to power a load source 500 while at the same time generating electrical power to recharge depleted supercapacitors 110 and 120 in the following manner. In this embodiment supercapacitor subsystem 100 comprises three supercapacitors, 110, 120, and 130. The method of using the illustrated systems may be initiated by the function control subsystem 310 transmitting a wired or wireless control signal to the switching subsystem 200 during a first operational stage. The function control subsystem 310 signals may cause the timer 210 to send low voltage control signals to the first, second and third low voltage contactors 220, 222 and 224. The timer 210 control signals may direct the first and third low voltage contactors 220 and 224 to couple the first positive pole of the first supercapacitor subsystem 110 to the first bus 240 through the conductor 150 and high voltage contactors 230 and/or 231. In turn, the first bus 240 connects the first supercapacitor subsystem 110 to the function control 310 and the electric motor 330. Because the second negative pole of the first supercapacitor subsystem 110 is permanently coupled to the function control 310 and the electric motor 330, a circuit is temporarily completed to power the electric motor using the first supercapacitor subsystem 110.

At the same time that the first supercapacitor 110 is used to power the electric motor 330 (i.e., the first operational phase), control signals sent from the function control 310 to the timer 210 may be used to control the first, second and third low voltage contactors 220, 222 and 224 to make other supercapacitor subsystems 120 and 130 connections and disconnections. Specifically, the low voltage contactors 220, 222, and 224 may be used to control the high voltage contactors 232, 233, 234 and 235 to temporarily connect the first positive pole of the second supercapacitor subsystem 120 to the second bus 242 and to temporarily isolate the first positive pole of the third supercapacitor subsystem 130 from any circuit. As a result, the second supercapacitor subsystem 120 may be connected to the rectifier subsystem 630, and the third supercapacitor subsystem 130 may be isolated during the first operational phase.

During the first operational phase, the electric motor 330 spins under the power of the first supercapacitor subsystem 110. The rotational motion of the electric motor 330 is used to drive the DC electric generator 380 through the electric motor 330. The torque resistance of the DC electric generator 380 on the DC electric motor 330 may vary depending upon the load applied to the DC generator 330 from the load source 500 and the supercapacitor charging subsystem 600. The speed of the DC electric motor 330 may be selectively adjusted by the function control 310 to optimize the speed for the load applied to the DC electric generator 380.

The electric power output of the DC electric generator 380 is directed in part by the AC power distribution subsystem 400 to the supercapacitor charging subsystem 600. The rectifier subsystem 630 of the supercapacitor charging subsystem 600, under the control of the function control 310, recharges the second supercapacitor subsystem 120 during the first operational phase. The first operational phase may be automatically ended after a set elapsed time, after detecting a set level of discharge of the first supercapacitor subsystem 110, or after a set level of recharge of the second supercapacitor subsystem 120.

The end of the first operational phase is followed immediately by the institution of a second operational phase during which the function control 310 directs the switching subsystem 200 to substitute the second supercapacitor subsystem 120 for the first supercapacitor subsystem 110, to substitute the third supercapacitor subsystem 130 for the second supercapacitor subsystem 120, and to substitute the first supercapacitor subsystem 110 for the third supercapacitor subsystem 130. In other words, during the second operational phase, the second supercapacitor subsystem 120 is used to power the system, the third supercapacitor subsystem 130 is recharged, and the first supercapacitor subsystem 110 is disconnected from the power and recharging circuits. During a third operational phase, the third supercapacitor subsystem 130 powers the system, the first supercapacitor subsystem 110 is recharged, and the second supercapacitor subsystem 120 is disconnected. The rotation through the first, second, and third operational phases may be repeated to provide uninterrupted power to the load source 500.

An embodiment of the system according to FIG. 1 of the present disclosure comprises: an electric power system comprising: an electric supercapacitor subsystem 100; a switching subsystem 200 coupled to the electric supercapacitor subsystem 100; an electric power generation subsystem 300 coupled to the switching subsystem 200 and the electric supercapacitor subsystem 100; an inverter subsystem coupled to the power generation subsystem 300; an AC power distribution subsystem 400 coupled to the inverter subsystem and an electric load 500; and a charging subsystem 600 coupled to the AC power distribution subsystem 400, the electric supercapacitor subsystem 100, and the switching subsystem 200.

The electrical connections according to the present embodiment of the system comprise: an electric supercapacitor subsystem 100; a switching subsystem 200 coupled to the electric supercapacitor subsystem 100; an electrically powered function control subsystem 310 coupled to the switching subsystem 200 and the electric supercapacitor subsystem 100, the electrically powered function control subsystem 310 including a processor and memory; a dielectric capacitor subsystem 320 coupled to the electrically powered function control subsystem 310; a DC electric motor subsystem 330 coupled to the electrically powered function control subsystem 310; a DC electric generator subsystem 380 operatively connected to, and receiving input rotational motion from, the DC electric motor subsystem 330, wherein output rotational speed of the DC electric motor subsystem 330 and input rotational speed provided to the DC electric generator subsystem 380 are invariable with respect to one another; at least one of an on-grid inverter subsystem 370 and an off-grid inverter subsystem 372 coupled to the DC electric generator subsystem 380; an AC power distribution subsystem 400 coupled to the on-grid inverter subsystem 370, the AC power distribution subsystem 400 including an outlet load line 420 configured to be connected to an electric load 500; a circuit breaker subsystem 620 coupled to the AC power distribution subsystem 400; and a rectifier subsystem 630 coupled to the electric supercapacitor subsystem 100, the switching subsystem 200, and the circuit breaker subsystem 620.

In an embodiment, the electric supercapacitor subsystem 100 comprises at least two supercapacitors 110, 120. In an embodiment, the electric power system of the present disclosure comprises a cooling subsystem 360 coupled to the electrically powered function control subsystem 310. In an embodiment, the electric supercapacitor subsystem 100 has a first pole with a first polarity and a second pole with a second polarity; the switching subsystem 200 coupled to the first pole of the electric supercapacitor subsystem 100; the electrically powered function control subsystem 310 coupled to the switching subsystem 200 and the second pole of the electric supercapacitor subsystem 100; the rectifier subsystem 630 coupled to the circuit breaker subsystem 620, the switching subsystem 200, and the second pole of the electric supercapacitor subsystem 100.

In an embodiment, the rotational speed of the DC electric motor subsystem 330 is set to optimize power depletion of the electric supercapacitor subsystem 100 for a predetermined level of available power on the outlet load line 420. In an embodiment, the electrically powered function control subsystem 310 provides automatic adjustment of the relative rotational speed of the DC electric motor subsystem 330. In an embodiment, the electrically powered function control subsystem 310 automatically sets an upper limit on available power for the outlet load line 420 based on DC power output of the DC electric generator subsystem 380 and charging requirements of the electric supercapacitor subsystem 100. In an embodiment, the off-grid inverter subsystem 372 is replaced by an on-grid inverter subsystem 370.

Figure 4:
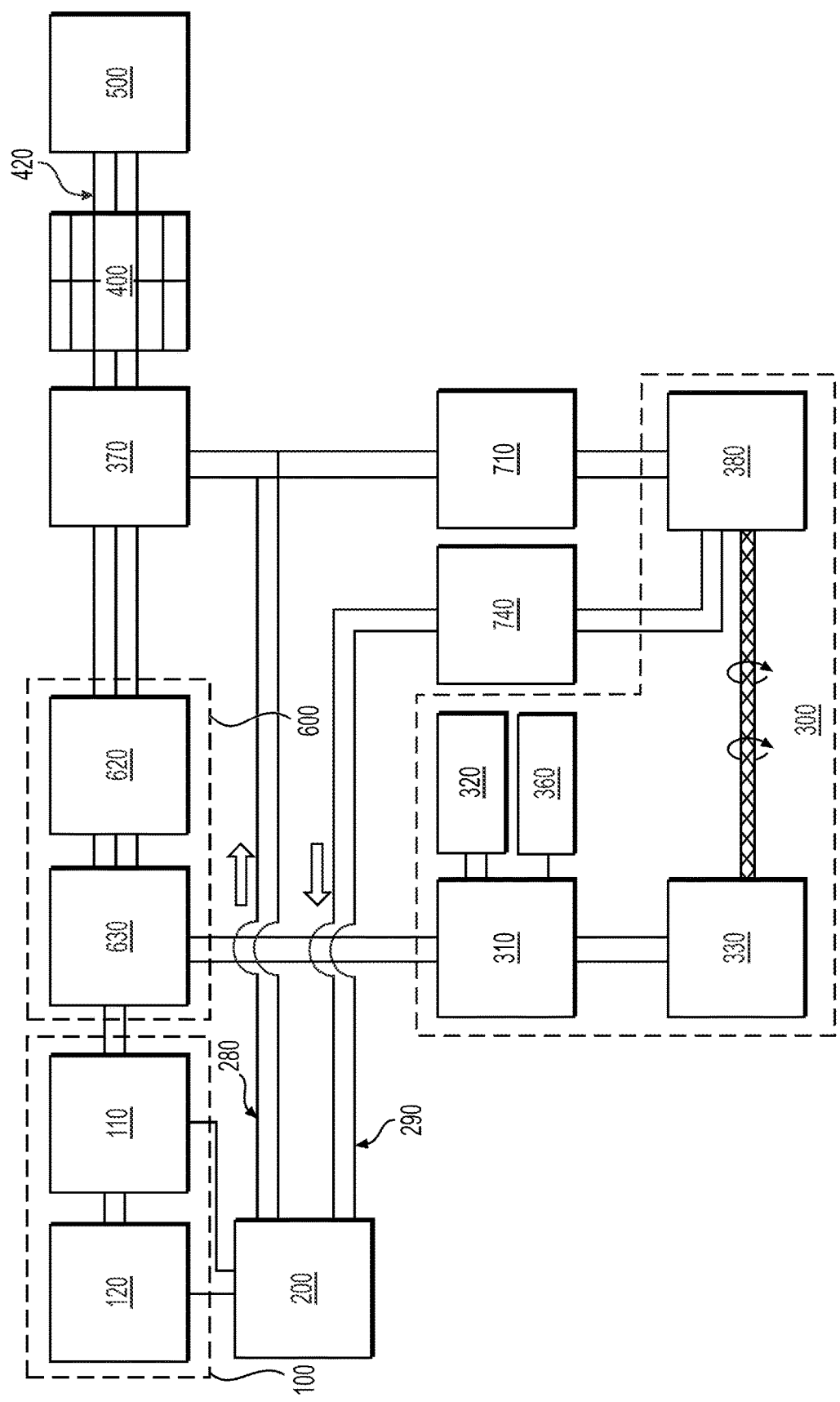
FIG. 4 is a schematic diagram of the components of the electric power generation, distribution, and storage system in accordance with a second embodiment of the present invention.

An alternative embodiment of the present invention is illustrated in FIG. 4, in which like reference characters refer to like elements that operate in like manner to those described in connection with the other embodiments. The power generation subsystem 300 may be connected through a first inductor 710 to a switching subsystem 200, then on to an on-grid inverter subsystem 370. The on-grid inverter subsystem 370 is connected, in turn, to an AC power distribution subsystem 400 for powering a load source 500. The on-grid inverter subsystem 370 is also connected to a charging subsystem 600, which, in turn, is connected to the power generation subsystem 300. In an embodiment, the charging subsystem 600 is also connected directly to the supercapacitor subsystem 100. In an embodiment, the on-grid inverter subsystem 370 is replaced by an off-grid inverter subsystem 372.

The power generation subsystem 300 is connected through a second inductor subsystem 740 to a switching subsystem 200, and the switching subsystem 200 is connected, in turn, to the supercapacitor subsystem 100, completing the circuit. The supercapacitor subsystem 100 may selectively supply power to the power generation subsystem 300 in sequence through the switching subsystem 200, the on-grid inverter subsystem 370, and the charging subsystem 600. The inverter may be at least one of an off grid inverter subsystem 372 and an on grid inverter subsystem 370. The supercapacitor subsystem 100 may be recharged by the power generation subsystem through, in sequence, the second inductor 740 and the switching subsystem 200. In an embodiment, the supercapacitor subsystem 100 may also be recharged directly by its connection to the charging subsystem 600.

With continued reference to FIG. 4, the overall system may be initiated to generate power by connecting the supercapacitor subsystem 100 to the switching subsystem 200. Power may flow from the switching subsystem 200 through the on-grid inverter subsystem 370 and the charging subsystem 600. Power from the charging subsystem 600 is provided to the power generation subsystem 300 via the connection of the charging subsystem 600 to the function control subsystem 310. The function control subsystem 310 applies the power from the charging subsystem 600 to a DC electric motor subsystem 330. In turn, the DC electric motor subsystem 330 drives a DC electric generator subsystem 380.

The DC electric motor subsystem 330 is operationally connected to the DC electric generator subsystem 380. The function control subsystem 310 may control the speed of the DC electric motor subsystem 330. Power flows from the DC electric generator subsystem 380 to both a first inductor subsystem 710 and a second inductor subsystem 740. Power from the first inductor subsystem 710 flows through the switching subsystem 200, on-grid inverter subsystem 370, charging subsystem 600, function control subsystem 310, and then to the DC electric motor subsystem 330. Power from the second inductor subsystem 740 flows through the switching subsystem 200 to the supercapacitor subsystem 100. In an embodiment, power may flow directly from the charging subsystem 600 to the supercapacitor subsystem 100.

The power generation subsystem 300 may also include a cooling subsystem 360 controlled by the function control subsystem 310. The cooling subsystem 360 may be in operational contact with any and/or all heat generating components of the overall system, such as the function control subsystem 310, the DC electric motor subsystem 330, and the DC electric generator subsystem 380. The cooling subsystem 360 may maintain system elements in optimal operating temperature ranges in a manner known to those of skill in the art.

A dielectric capacitor subsystem 320 may be electrically coupled to the function control subsystem 310. The dielectric capacitor subsystem 320 may include a plurality of dielectric capacitors interconnected in parallel with one another. The dielectric capacitor subsystem 320 may be used to control and correct system characteristics such as power factor lag and phase shift. The dielectric capacitor subsystem 320 may also increase stored energy and improve stabilization of the sine wave generated by the processor in the function control subsystem 310.

The function control subsystem 310 may include a digital processor, digital memory components, and control programming as needed to operate the overall system in the manner described herein. For example, the function control subsystem 310 may include programming that controls system components for a start-up sequence, a shut-down sequence, vibration monitoring, over heat monitoring, and remote monitoring. The function control subsystem 310 may also include or be connected to one or more parameter monitoring components that provide system data. Such data may include, but not limited to: supercapacitor charge level and capacity, supercapacitor amperage, supercapacitor voltage, supercapacitor usage time, supercapacitor charge time, current time, system element temperatures, vibration, source load, electric motor torque, electric motor rpm, electric generator torque, electric generator rpm, supercapacitor charging system load, rectifier settings, and inductor settings.

In a preferred embodiment, the DC electric generator 380 may output 10 kw of power with relatively low torque requirements at low rpms. For example, the DC electric generator 380 may require about 5 foot-pounds of torque per about 1 kw of output power. In an embodiment, the inverter is an on-grid inverter 370. The power output from the DC electric generator 380 may be provided to the on-grid (e.g., 10 kw) inverter 370 requiring 220 AC volts to operate. In turn, the AC power from the on-grid inverter 370 may be provided on-line to a local or national power grid, local power outlets, and the AC power distribution subsystem 400.

Once the overall system is up and generating power, the on-grid inverter 370 may supply all of the current demands for the load source 500 connected to the AC power distribution subsystem 400, as well as supply the current needed to power the DC electric motor subsystem 330. Any excess power may be supplied from the on-grid inverter 370 to the national grid to power loads connected to the grid such as a home electrical system 410 (not shown). This excess power delivered to the national grid may be sold to the power company or traded for credit.

As noted above, the AC power distribution subsystem 400 may be connected to the national grid to deliver power to homes, including a home electrical system 410 (not shown), and the like. The power from the charging subsystem 600 may be used to keep the supercapacitor subsystem 100 fully charged. Excess power not needed for recharging may be directed to the power generation subsystem 300 and used to power the DC electric motor 330. When the supercapacitor subsystem 100 is in a fully charged state, all of the power to drive the DC electric motor 330 may be supplied by the charging subsystem 600. In this manner, the supercapacitor subsystem 100 may function as a current catalyst as opposed to a current provider. In an embodiment, a supercapacitor charge controller subsystem 650 (not shown) may couple the AC power distribution subsystem 400 and the supercapacitor subsystem 100.

An embodiment of the system according to FIG. 4 of the present disclosure comprises: An electric power system comprising: an electric supercapacitor subsystem 100; a switching subsystem 200 coupled to the electric supercapacitor subsystem 100; an inverter subsystem coupled to the switching subsystem 200, an AC power distribution subsystem 400, and a charging subsystem 600, wherein the charging subsystem 600 is coupled to the electric supercapacitor subsystem 100 and an electric power generation subsystem 300; a first inductor 710 and a second inductor 740 coupled to the power generation subsystem 300, wherein the first inductor 710 is coupled to the inverter subsystem via switching subsystem 200 and the second inductor 740 is coupled to the electric supercapacitor subsystem 100 via switching subsystem 200.

The electrical connections according to the present embodiment of the system comprise: an electric supercapacitor subsystem 100; a switching subsystem 200 and a rectifier subsystem 630 coupled to the electric supercapacitor subsystem 100; an electrically powered function control subsystem 310 coupled to the rectifier subsystem 630, the electrically powered function control subsystem 310 including a processor and memory; a dielectric capacitor subsystem 320 coupled to the electrically powered function control subsystem 310; a DC electric motor subsystem 330 coupled to the electrically powered function control subsystem 310; a DC electric generator subsystem 380 operatively connected to, and receiving input rotational motion from, the DC electric motor subsystem 330, wherein output rotational speed of the DC electric motor subsystem 330 and input rotational speed provided to the DC electric generator subsystem 380 are invariable with respect to one another; a first inductor subsystem 710 and a second inductor subsystem 740 coupled to the DC electric generator subsystem 380 and the switching subsystem 200; an on-grid inverter subsystem 370 coupled to the first inductor subsystem 710; a circuit breaker subsystem 620 coupled to the on-grid inverter subsystem 370 and the rectifier subsystem 630; and an AC power distribution subsystem 400 coupled to the on-grid inverter subsystem 370, wherein the AC power distribution subsystem 400 includes an outlet load line 420 coupled to an electric load 500.

In an embodiment, the electric supercapacitor subsystem 100 comprises at least two supercapacitors 110, 120. In an embodiment, the system comprises a cooling subsystem 360 coupled to the electrically powered function control subsystem 310. In an embodiment, the rotational speed of the DC electric motor subsystem 330 and the DC electric generator subsystem 380 are set to optimize power depletion of the electric supercapacitor subsystem 100 for a predetermined level of available power on the outlet load line 420. In an embodiment, the electrically powered function control subsystem 310 provides automatic adjustment of the relative rotational speed of the DC electric motor subsystem 330 to the DC electric generator subsystem 380. In an embodiment, the electrically powered function control subsystem 310 automatically sets an upper limit on available power for the outlet load line 420 based on the AC power output of the DC electric generator subsystem 380 and charging requirements of the electric supercapacitor subsystem 100. In an embodiment, the on-grid inverter subsystem 370 is replaced by an off-grid inverter subsystem 372.

Figure 5:
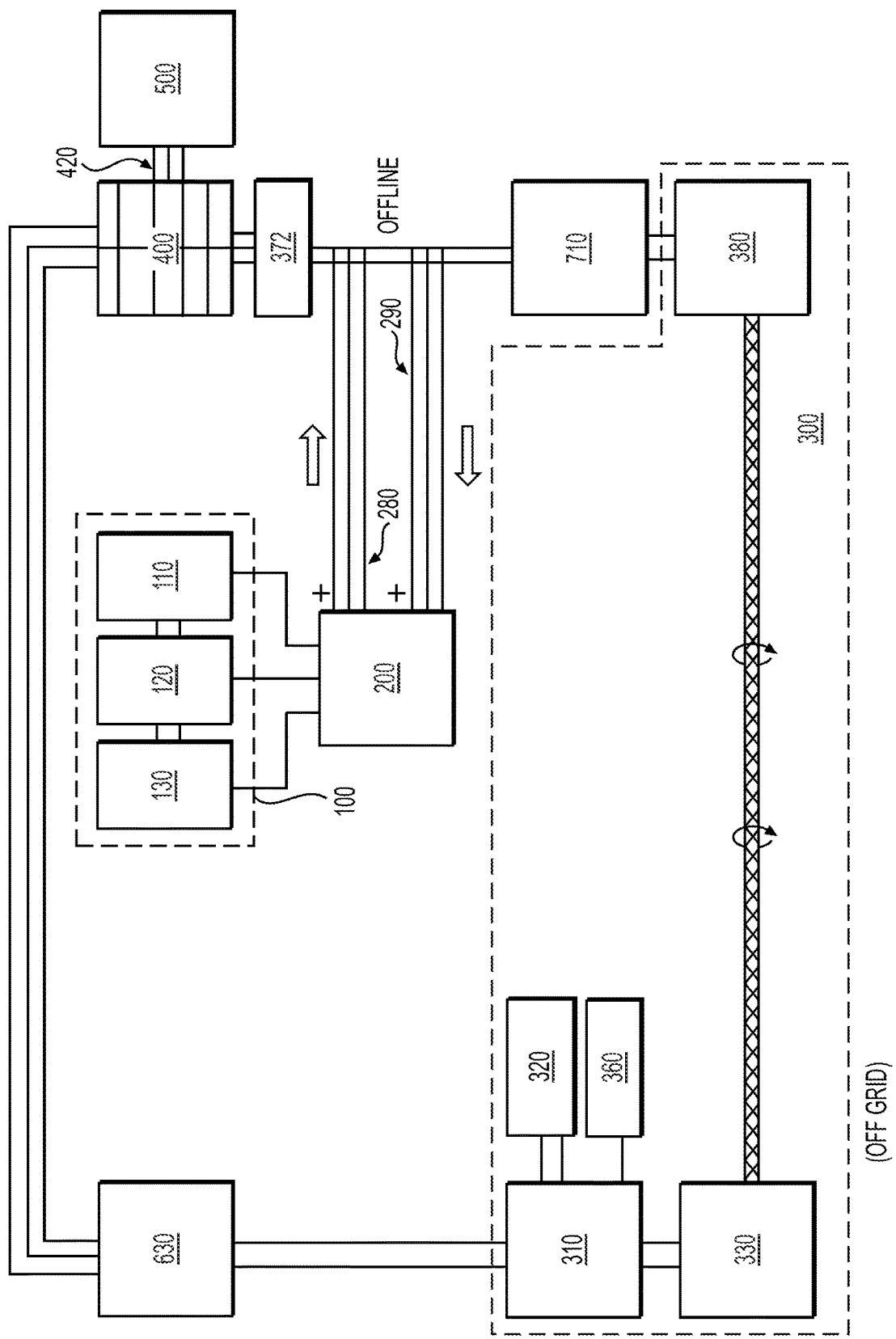
FIG. 5 is a schematic diagram of the components of the electric power generation, distribution, and storage system in accordance with a third embodiment of the present invention.

With reference to FIG. 5, a system that is almost identical to that shown in FIG. 4 is illustrated. The FIG. 5 system differs from the FIG. 4 system in that it includes an (e.g., 8 kw) off-grid inverter subsystem 372 instead of an on-grid inverter subsystem 370, no second inductor subsystem 740 or circuit breaker subsystem 620, and no direct connection from charging subsystem 600 to supercapacitor subsystem 100. The off-grid inverter subsystem 372 is not connected to the national power grid. The system of FIG. 5 operates in the same way as the system of FIG. 4, except that there is no connection to the national power grid and thus no ability to supply power from the off-grid inverter subsystem 372 to the national power grid.

Figure 6:
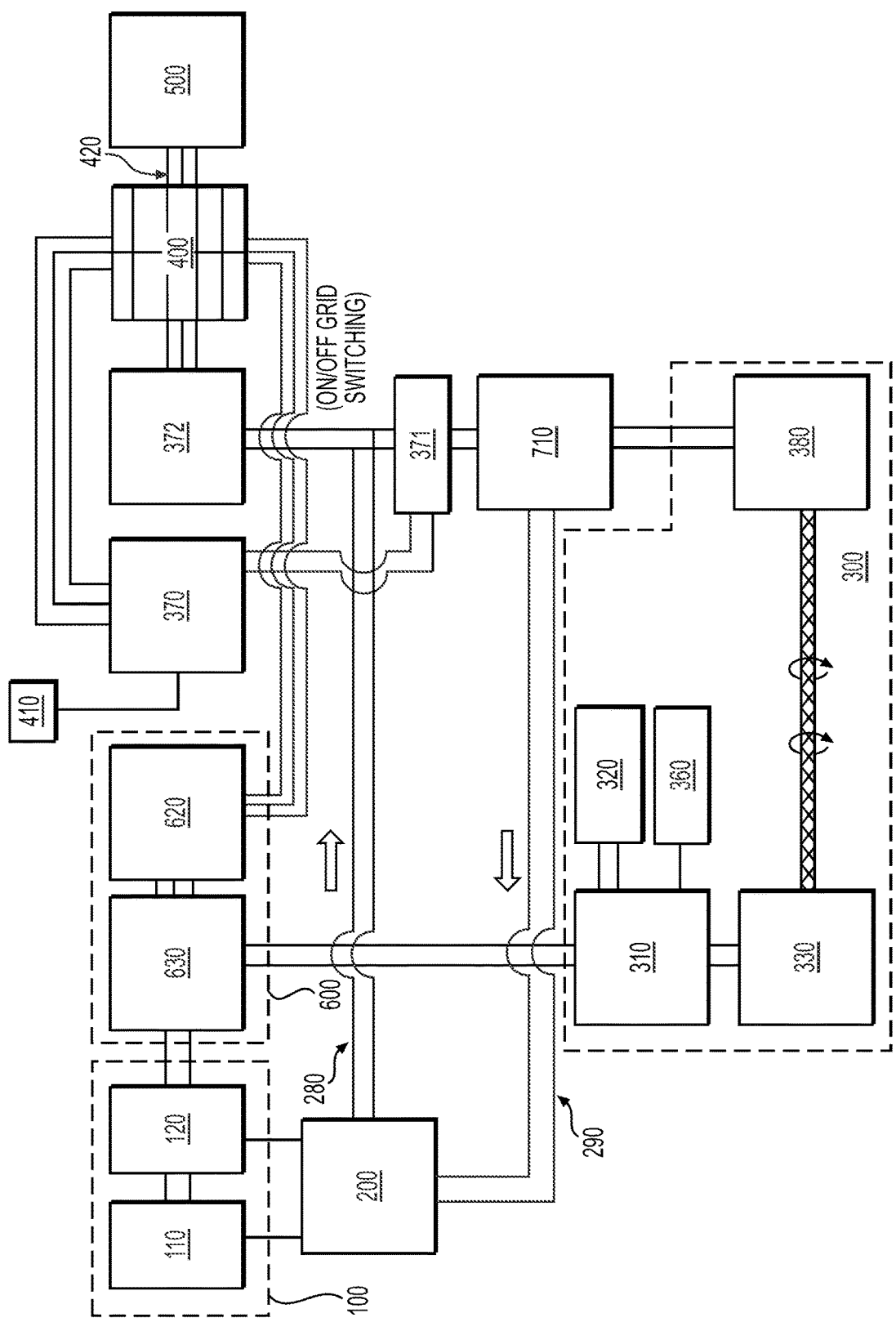
FIG. 6 is a schematic diagram of an electric power generation, distribution, and storage system in accordance with a fourth embodiment of the present invention used for on-grid and off-grid power supply.

FIG. 6 illustrates a system which combines the elements of FIGS. 4 and 5 so that both an on-grid inverter subsystem 370 and an off-grid inverter subsystem 372 are included. The system of FIG. 6 may be used to provide uninterrupted power when the national grid goes down. The system of FIG. 6 includes a feature that causes the system to use the on-grid inverter subsystem 370 when the national power grid is functioning. When the national power grid fails, however, the system switches through a transfer switch 371 to the off-grid inverter 372 to supply power, thereby disconnecting the system from the national power grid.

Figure 7:
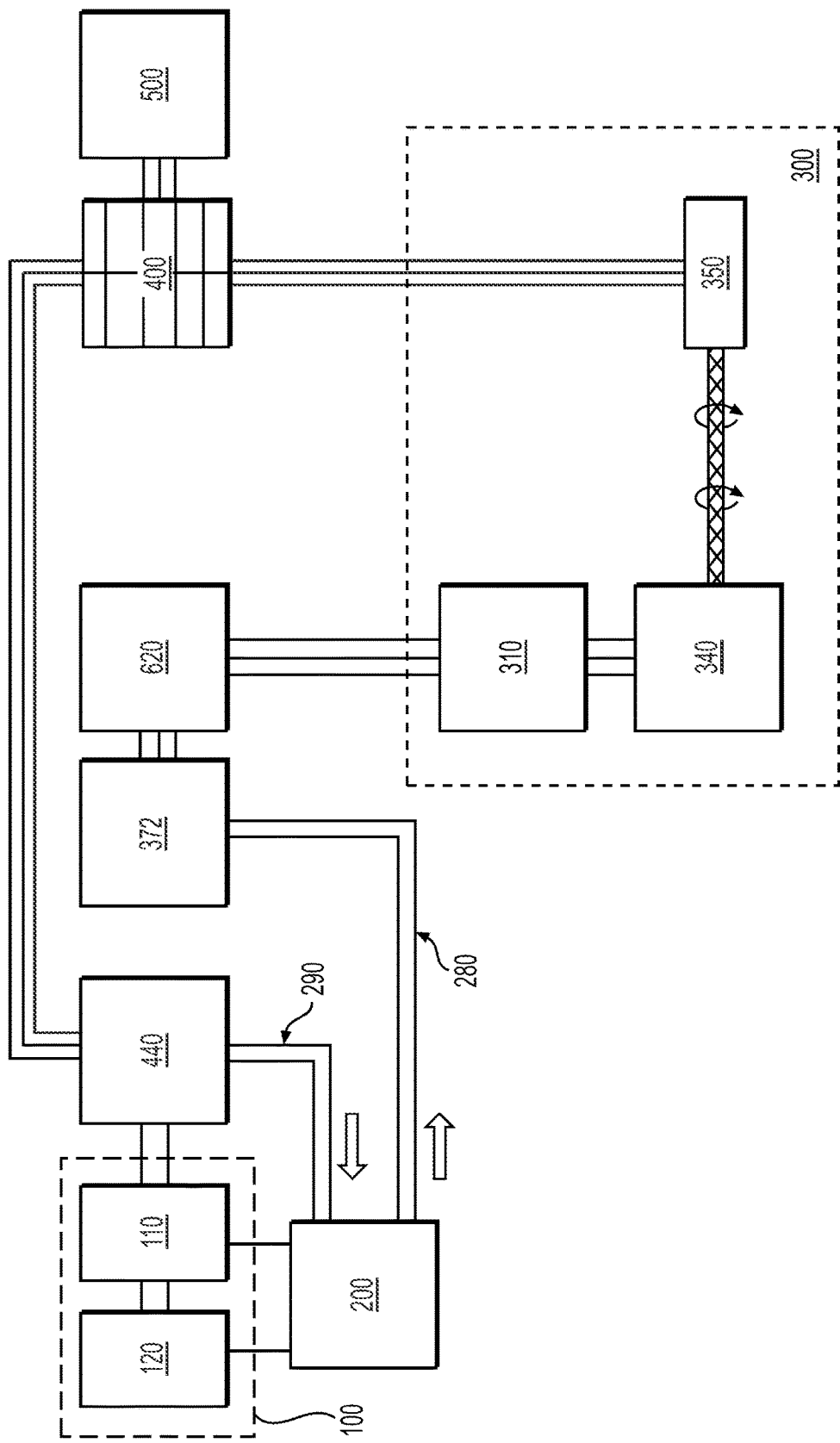
FIG. 7 is a schematic diagram of an electric power generation, distribution, and storage system in accordance with a fifth embodiment of the present invention.

An alternative embodiment of the present invention is illustrated in FIG. 7, in which like reference characters refer to like elements which operate in like manner to those described in connection with the other embodiments. The system of FIG. 7 is similar to the previously described embodiments, substituting an AC electric motor subsystem 340 for the DC electric motor subsystem 330 and an AC electric generator subsystem 350 for the DC electric generator subsystem 380. The novel AC electric generator subsystem 350, according to an embodiment of the present disclosure, is also able to operate with the same low torque as the novel DC electric generator subsystem 380 disclosed above, the AC electric generator 350 may output about 10 kw of power with relatively low torque requirements at low rpms. For example, the AC electric generator 350 may require about 5 foot-pounds of torque per about 1 kw of output power.

A supercapacitor subsystem 100 is connected to a switching subsystem 200, which, in turn, is connected to a circuit breaker subsystem 620 through an off-grid inverter subsystem 372. In an embodiment, the off-grid inverter subsystem 372 is replaced by an on-grid inverter subsystem 370. The circuit breaker subsystem 620 is connected to a power generation subsystem 300. The power generation subsystem 300, in turn, is connected to an AC power distribution subsystem 400. The AC power distribution subsystem 400 is connected to both an electric load 500 and a quick charger subsystem 440. The quick charger subsystem 440 is connected to both the switching subsystem 200 and the supercapacitor subsystem 100, thereby completing the circuit.

The switching subsystem 200 may control the switching of the supercapacitor subsystem 100 into and out of the overall circuit to receive recharging power through the quick charge subsystem 440, which is connected to the power generation subsystem 300 through the AC power distribution subsystem 400 to complete the circuit.

With continued reference to FIG. 7, in an embodiment, the overall system may be initiated to generate power by connecting the supercapacitor subsystem 100 to the off-grid inverter subsystem 372 through and under the control of the switching subsystem 200. Power may flow from the off-grid inverter subsystem 372 through the circuit breaker subsystem 620 to the power generation subsystem 300 via an electrical connection between the circuit breaker subsystem 620 and the function control subsystem 310. As previously disclosed, an on-grid inverter subsystem 370 may be substituted for the off-grid inverter subsystem 372.

The function control subsystem 310 applies the power from the circuit breaker subsystem 620 to the AC electric motor subsystem 340. In turn, the AC electric motor subsystem 340 drives an AC electric generator subsystem 350. The power generated by the AC electric generator subsystem 350 flows to an AC power distribution subsystem 400. The power from the AC power distribution subsystem 400 flows to both an electric load 500 and the quick charge subsystem 440, and from the quick charge subsystem 440 back to the switching subsystem 200, and, in an embodiment, to both the switching subsystem 200 and directly to the supercapacitor subsystem 100. The quick charge subsystem 440 may comprise a rectifier subsystem 630.

The function control subsystem 310, among other things, may control the speed of the AC electric motor subsystem 340. The rotational speed of the coupler between the AC electric motor subsystem 340 and the AC electric generator 350 may vary depending on need, but, as in the DC systems of FIG. 1-6, the rotational speed of the coupler is invariable with respect to the output speed of the AC electric motor subsystem 340 and the AC electric generator 350.

The power generation subsystem 300 may also include a cooling subsystem 360 (not shown) controlled by the function control subsystem 310. The cooling subsystem 360 may be in operational contact with any and/or all heat generating components of the overall system, such as the function control subsystem 310, the AC electric motor subsystem 340, and the AC electric generator subsystem 350. The cooling subsystem 360 may maintain system elements in optimal operating temperature ranges in a manner known to those of skill in the art.

As in the DC system according to FIG. 1-6, the function control subsystem 310 may include a digital processor, digital memory components, and control programming as needed to operate the overall system in the manner described herein. For example, the function control subsystem 310 may include programming that controls system components for a start-up sequence, a shut-down sequence, vibration monitoring, overheat monitoring, and remote monitoring. The function control subsystem 310 may also include or be connected to one or more parameter monitoring components that provide system data. Such data may include, but not limited to: supercapacitor charge level and capacity, supercapacitor amperage, supercapacitor voltage, supercapacitor usage time, supercapacitor charge time, current time, system element temperatures, vibration, source load, electric motor torque, electric motor rpm, electric generator torque, electric generator rpm, supercapacitor charging system load, rectifier settings, and inductor settings.

The power flowing from the power generation subsystem 300 through the AC power distribution subsystem 400 to the quick charge subsystem 440 may be used to keep the supercapacitor subsystem 100 fully charged.

Excess power not needed for recharging may be directed to the off-grid inverter subsystem 372, the circuit breaker subsystem 620, and electric function control subsystem 310 to power the AC electric motor subsystem 340.

When the supercapacitor subsystem 100 is in a fully charged state, substantially all of the power to drive the AC electric motor subsystem 340 may be supplied by the quick charge subsystem 440 through the supercapacitor subsystem 100. In this manner, the supercapacitor subsystem 100 may function as a current catalyst as opposed to a current provider.

An embodiment of the system according to FIG. 7 of the present disclosure comprises: an electric power system comprising: an electric supercapacitor subsystem 100; a switching subsystem 200 coupled to the electric supercapacitor subsystem 100; an inverter subsystem coupled to the switching subsystem 200; a circuit breaker subsystem 620 coupled to the inverter subsystem; a power generation subsystem 300 coupled to the circuit breaker subsystem 620; an AC power distribution subsystem 400 coupled to the power generation subsystem 300 and an electric load 500; a quick charging subsystem 440 comprising a rectifier subsystem 630 coupled to the AC power distribution subsystem 400, the switching subsystem 200, and the electric supercapacitor subsystem 100. The inverter subsystem is at least one of an on-grid inverter subsystem 370 and an off-grid inverter subsystem 372.

In an embodiment, the electric power generation subsystem 300 comprises: an electrically powered function control subsystem 310 coupled to the circuit breaker subsystem 620; an electric motor subsystem coupled to the electrically powered function control subsystem 310; and an electric generator subsystem coupled to the AC power distribution subsystem 400 and the electric motor subsystem, wherein the electric generator subsystem is operatively connected to, and receiving input rotational motion from, the electric motor subsystem. In an embodiment, the output rotational speed of the electric motor subsystem and input rotational speed provided to the electric generator subsystem are invariable with respect to one another.

The electrical connections according to the present embodiment of the system comprise: an electric supercapacitor subsystem 100; a switching subsystem 200 coupled to the electric supercapacitor subsystem 100; at least one of an off-grid inverter subsystem 372 and an on-grid inverter subsystem 370 coupled to the switching subsystem 200 via an output conductor 280; a circuit breaker subsystem 620 coupled to the at least one of an off-grid inverter subsystem 372 and an on-grid inverter subsystem 370; an electrically powered function control subsystem 310 coupled to the circuit breaker subsystem, the electrically powered function control subsystem 310 including a processor and memory; an AC electric motor subsystem 340 coupled to the electrically powered function control subsystem 310; an AC electric generator subsystem 350 operatively connected to, and receiving input rotational motion from, the AC electric motor subsystem 350, wherein output rotational speed of the AC electric motor subsystem 340 and input rotational speed provided to the AC electric generator subsystem 350 are invariable with respect to one another; an AC power distribution subsystem 400 coupled to the AC electric generator subsystem 350, the AC power distribution subsystem 400 including an outlet load line 420 configured to be connected to an electric load 500; a quick charging subsystem 440 comprising a rectifier 630 coupled to the AC power distribution subsystem 400; and the quick charging subsystem 440 is coupled to the switching subsystem 200 via input conductor 290, and to the electric supercapacitor subsystem 100.

In an embodiment, the electric supercapacitor subsystem 100 comprises at least two supercapacitors 110, 120. In an embodiment, the system further comprises a cooling subsystem 360 coupled to the electrically powered function control subsystem 310. In an embodiment, the rotational speed of the AC electric motor subsystem 340 is set to optimize power depletion of the electric supercapacitor subsystem 100 for a predetermined level of available power on the outlet load line 420. In an embodiment, the electrically powered function control subsystem 310 provides automatic adjustment of the relative rotational speed of the AC electric motor subsystem 340. In an embodiment, the electrically powered function control subsystem 310 automatically sets an upper limit on available power for the outlet load line 420 based on AC power output of the AC electric generator subsystem 350 and charging requirements of the electric supercapacitor subsystem 100. In an embodiment, the on-grid inverter subsystem 370 is replaced by an off-grid inverter subsystem 372.

A method of generating, storing, and distributing electric power according to the embodiment exemplified in FIG. 1 comprises: applying DC electric power from an electric supercapacitor subsystem 100 to an electrically powered function control subsystem 310, wherein the electrically powered function control subsystem 310 is coupled to a dielectric capacitor subsystem 320; applying the DC electric power from the electrically powered function control subsystem 310 to a DC motor subsystem 330; providing input rotational motion from the DC motor subsystem 330 to an DC electric generator subsystem 380, wherein output rotational speed of the DC motor subsystem 330 and input rotational speed provided to the DC electric generator subsystem 380 are invariable with respect to one another; generating DC electric power from the output rotational motion of the DC motor subsystem 330, wherein a rotational speed is set to optimize wattage supply for external electric distribution; applying the DC electric power from the to the DC electric generator subsystem 380 to at least one of an off-grid inverter subsystem 372 and an on-grid inverter subsystem 370; converting the DC electric power to AC electric power; applying the AC electric power to an AC power distribution subsystem 400; distributing a first portion of the AC electric power from the AC power distribution subsystem 400 to an outlet load line 420 connected to an electric load 500; distributing a second portion of the AC electric power from the AC power distribution subsystem 400 to a circuit breaker subsystem 620; applying the AC electric power from the circuit breaker subsystem 620 to a rectifier subsystem 630 and generating additional DC electric power using the rectifier subsystem 630; and applying the additional DC electric power from the rectifier subsystem 630 to the electric supercapacitor subsystem 100, wherein a relationship of the output rotational motion of the DC electric motor subsystem 330 is set to optimize power depletion of the electric supercapacitor subsystem 100 for a predetermined level of available power on the outlet load line 420.

A method of generating, storing, and distributing electric power according to the embodiment exemplified in FIG. 4 comprises: applying DC electric power from an electric supercapacitor subsystem 100 to a switching subsystem 200; applying the DC electric power from the switching subsystem 200 to at least one of an off-grid inverter subsystem 372 and an on-grid inverter subsystem 370 via output conductor 280; converting the DC electric power to AC electric power; distributing a first portion of the AC electric power to an AC electric power distribution subsystem 400; applying the first portion of the AC electric power from the AC electric power distribution subsystem 400 to an outlet load line 420 coupled to an electric load 500; distributing a second portion of the AC electric power to a circuit breaker subsystem 620; applying the second portion of the AC electric power from the circuit breaker subsystem 620 to a rectifier subsystem 630; converting the second portion of the AC electric power to DC electric power; applying the DC electric power to an electrically powered function control subsystem 310; applying the DC electric power from the electrically powered function control subsystem 310 to a DC motor subsystem 330; providing input rotational motion from the DC motor subsystem 330 to a DC electric generator subsystem 380, wherein the output rotational speed of the DC motor subsystem 330 and input rotational speed provided to the DC electric generator subsystem 380 are invariable with respect to one another; generating DC electric power from the output rotational motion of the DC motor subsystem 330, wherein rotational speed is set to optimize wattage supply for distribution to the electric load 500; applying a first portion of the DC electric power from the DC electric generator subsystem 380 to a first inductor subsystem 710; applying the first portion of the DC electric power from the first inductor subsystem 710 to the on-grid inverter subsystem 370; applying a second portion of the DC electric power from the DC electric generator subsystem 380 to a second inductor subsystem 740; and applying the second portion of the DC electric power from the second inductor subsystem 740 to the switching subsystem 200 via input conductor 290.

A method of generating, storing, and distributing electric power according to the embodiment exemplified in FIG. 5 comprises: applying DC electric power from an electric supercapacitor subsystem 100 to a switching subsystem 200; applying the DC electric power from the switching subsystem 200 to at least one of an off-grid inverter subsystem 372 and an on-grid inverter subsystem 370 via output conductor 280; converting the DC electric power to AC electric power; applying the AC electric power to an AC electric power distribution subsystem 400; distributing a first portion of the AC electric power from the AC electric power distribution subsystem 400 to an outlet load line 420 coupled to an electric load 500; distributing a second portion of the AC electric power from the AC electric power distribution subsystem 400 to a rectifier subsystem 630; converting the second portion of the AC electric power to DC electric power; applying the DC electric power to an electrically powered function control subsystem 310; applying the DC electric power from the electrically powered function control subsystem 310 to a DC motor subsystem 330; providing input rotational motion from the DC motor subsystem 330 to a DC electric generator subsystem 380, wherein the output rotational speed of the DC motor subsystem 330 and input rotational speed provided to the DC electric generator subsystem 380 are invariable with respect to one another; generating DC electric power from the output rotational motion of the DC motor subsystem 330, wherein rotational speed is set to optimize wattage supply for distribution to the electric load 500; applying a first portion of the DC electric power from the DC electric generator subsystem 380 to a first inductor subsystem 710; and applying a second portion of the DC electric power from the DC electric generator subsystem 380 to the switching subsystem 200 via input conductor 290; and applying a variable amount of the second portion of the DC electric power from the switching subsystem 200 to the electric supercapacitor subsystem 100.

A method of generating, storing, and distributing electric power according to the embodiment exemplified in FIG. 6 comprises: applying DC electric power from an electric supercapacitor subsystem 100 to a switching subsystem 200; applying the DC electric power from the switching subsystem 200 to an off-grid inverter subsystem 372 via output line 280; converting the DC electric power to AC electric power; applying the AC electric power to an AC electric power distribution subsystem 400; distributing a first portion of the AC electric power from the AC electric power distribution subsystem 400 to an outlet load line 420 coupled to an electric load 500; distributing a second portion of the AC electric power from the AC electric power distribution subsystem 400 to circuit breaker subsystem 620; applying the second portion of the AC electric power from the circuit breaker subsystem 620 to a rectifier subsystem 630; converting the second portion of the AC electric power to DC electric power; distributing a first portion of the DC electric power to an electric supercapacitor subsystem 100; distributing a second portion of the DC electric power to an electrically powered function control subsystem 310; applying the DC electric power from the electrically powered function control subsystem 310 to a DC motor subsystem 330; providing input rotational motion from the DC motor subsystem 330 to a DC electric generator subsystem 380, wherein output rotational speed of the DC motor subsystem 330 and input rotational speed provided to the DC electric generator subsystem 380 are invariable with respect to one another; generating DC electric power from the DC electric generator subsystem 380 via the output rotational motion of the DC motor subsystem 330; applying the DC electric power from the DC electric generator subsystem 380 to a first inductor 710; distributing a first portion of the DC electric power from the first inductor 710 to the switching subsystem 200 via input conductor 290; applying a variable amount of the first portion of the DC electric power from the switching subsystem 200 to the electric supercapacitor subsystem 100; distributing a second portion of the DC electric power from the first inductor 710 to a transfer switch subsystem 371; distributing a first portion of the DC electric power from the transfer switch subsystem 371 to an off-grid inverter subsystem 372; distributing a second portion of the DC electric power from the transfer switch subsystem 371 to an on-grid inverter subsystem 370; converting both the first portions and second portions of the DC electric power to AC electric power; applying the AC electric power from both the off-grid inverter subsystem 372 and the on-grid inverter subsystem 370 to an AC power distribution subsystem 400; and applying the AC electric power from the AC power distribution subsystem to an electric load 500 via outlet load line 420.

A method of generating, storing, and distributing electric power according to the embodiment exemplified in FIG. 7 comprises: applying DC electric power from an electric supercapacitor subsystem 100 to a switching subsystem 200; applying the DC electric power from the switching subsystem 200 to at least one of an off-grid inverter subsystem 372 and an on-grid inverter subsystem 370 via output line 280; converting the DC electric power to AC electric power; applying the AC electric power to a circuit breaker subsystem 620; applying the AC electric power from the circuit breaker subsystem 620 to an electrically powered function control subsystem 310; applying the AC electric power from the electrically powered function control subsystem 310 to an AC motor subsystem 340; providing input rotational motion from the AC motor subsystem 340 to an AC electric generator subsystem 350, wherein output rotational speed of the AC motor subsystem 340 and input rotational speed provided to the AC electric generator subsystem 350 are invariable with respect to one another; generating AC electric power from the AC electric generator subsystem 350 via the output rotational motion of the AC motor subsystem 340; applying the AC electric power from the AC electric generator subsystem 350 to an AC power distribution subsystem 400; distributing a first portion of the AC electric power from the AC power distribution subsystem 400 to an electric load 500 via outlet load line 420; distributing a second portion of the AC electric power from the AC power distribution subsystem 400 to a quick charging subsystem 440; converting the second portion of the AC electric power to DC electric power; applying a first portion of the DC electric power to the switching subsystem 200 via input conductor 290; and applying a second portion of the DC electric power to the electric supercapacitor subsystem 100.

As will be understood by those skilled in the art, the invention may be embodied in other specific forms without departing from the spirit or essential characteristics thereof. The elements described above are provided as illustrative examples of one technique for implementing the invention. One skilled in the art will recognize that many other implementations are possible without departing from the present invention as recited in the claims. For example, the types, sizes and capacities of the batteries, electric motor, electric generator, inductor and rectifier used may vary without departing from the intended scope of the invention. Accordingly, the disclosure of the present invention is intended to be illustrative, but not limiting, of the scope of the invention. It is intended that the present invention cover all such modifications and variations of the invention, provided they come within the scope of the appended claims and their equivalents.

What is claimed is:

1. An electric power system comprising:
   an electric supercapacitor subsystem;
   a switching subsystem coupled to the electric supercapacitor subsystem;
   an inverter subsystem coupled to the switching subsystem;
   a power distribution subsystem coupled to the inverter subsystem and an electric load;
   a charging subsystem comprising a rectifier subsystem coupled to the power distribution subsystem;
   a power generation subsystem coupled to the charging subsystem; and
   a first inductor subsystem coupled to the power generation subsystem, the switching subsystem, and the inverter subsystem.

2. The electric power system of claim 1, wherein the inverter subsystem is at least one of an on-grid inverter subsystem and an off-grid inverter subsystem.

3. The electric power system of claim 1, wherein the electric power generation subsystem comprises:
   an electrically powered function control subsystem coupled to the charging subsystem via the rectifier subsystem;
   a dielectric capacitor subsystem coupled to the electrically powered function control subsystem;
   an electric motor subsystem coupled to the electrically powered function control subsystem; and
   an electric generator subsystem coupled to the power distribution subsystem and the electric motor subsystem, wherein the electric generator subsystem is operatively connected to, and receiving input rotational motion from, the electric motor subsystem.

4. The electric power system of claim 3, wherein an output rotational speed of the electric motor subsystem and input rotational speed provided to the electric generator subsystem are invariable with respect to one another.

5. The electric power system of claim 3, wherein the electric motor subsystem is a DC electric motor subsystem, the electric generator subsystem is a DC electric generator subsystem, and the power distribution subsystem is an AC power distribution subsystem.

6. The electric power system of claim 3, wherein the electrically powered function control subsystem automatically sets an upper limit on available power for the outlet load line based on the power output of the electric generator subsystem and charging requirements of the electric supercapacitor subsystem.

7. A method of generating, storing, and distributing electric power comprising:
   applying DC electric power from an electric supercapacitor subsystem to a switching subsystem;
   applying the DC electric power from the switching subsystem to at least one of an off-grid inverter subsystem and an on-grid inverter subsystem via output conductor;
   converting the DC electric power to AC electric power;
   applying the AC electric power to an AC electric power distribution subsystem;
   distributing a first portion of the AC electric power from the AC electric power distribution subsystem to an outlet load line coupled to an electric load;
   distributing a second portion of the AC electric power from the AC electric power distribution subsystem to a rectifier subsystem;
   converting the second portion of the AC electric power to DC electric power;
   applying the DC electric power to an electrically powered function control subsystem;
   applying the DC electric power from the electrically powered function control subsystem to a DC motor subsystem;
   providing input rotational motion from the DC motor subsystem to a DC electric generator subsystem, wherein the output rotational speed of the DC motor subsystem and input rotational speed provided to the DC electric generator subsystem are invariable with respect to one another;
   generating DC electric power from the output rotational motion of the DC motor subsystem, wherein rotational speed is set to optimize wattage supply for distribution to the electric load;
   applying a first portion of the DC electric power from the DC electric generator subsystem to a first inductor subsystem; and
   applying a second portion of the DC electric power from the DC electric generator subsystem to the switching subsystem via input conductor; and
   applying a variable amount of the second portion of the DC electric power from the switching subsystem to the electric supercapacitor subsystem.

* * * * *